United States Patent
Ferre et al.

(10) Patent No.: US 10,766,718 B2
(45) Date of Patent: Sep. 8, 2020

(54) TOOL AND METHOD FOR GRIPPING A PALLET

(71) Applicant: SIDEL END OF LINE SOLUTIONS FRANCE, Saint-Laurent-sur-Sevre (FR)

(72) Inventors: Laurent Ferre, Saint-Laurent-sur-Sevre (FR); Didier Maudet, Saint-Laurent-sur-Sevre (FR)

(73) Assignee: SIDEL END OF LINE SOLUTIONS FRANCE, Saint-Laurent-sur-Sèvre (FR)

( * ) Notice: Subject to any disclaimer, the term of this patent is extended or adjusted under 35 U.S.C. 154(b) by 0 days.

(21) Appl. No.: 16/081,783

(22) PCT Filed: Mar. 3, 2017

(86) PCT No.: PCT/FR2017/050485
§ 371 (c)(1),
(2) Date: Aug. 31, 2018

(87) PCT Pub. No.: WO2017/149259
PCT Pub. Date: Sep. 8, 2017

(65) Prior Publication Data
US 2019/0062073 A1 Feb. 28, 2019

(30) Foreign Application Priority Data
Mar. 4, 2016 (FR) ...................................... 16 51831

(51) Int. Cl.
*B65G 47/90* (2006.01)
*B65G 49/06* (2006.01)
*B66F 9/18* (2006.01)

(52) U.S. Cl.
CPC ......... *B65G 47/902* (2013.01); *B65G 49/069* (2013.01); *B66F 9/18* (2013.01); *B65G 2201/0267* (2013.01); *B65G 2249/04* (2013.01); *B65G 2249/045* (2013.01)

(58) Field of Classification Search
CPC ................................ B65G 47/902; B66F 9/18
See application file for complete search history.

(56) References Cited

U.S. PATENT DOCUMENTS

| | | | | |
|---|---|---|---|---|
| 5,042,862 A | * | 8/1991 | Tubke | B65G 47/90 294/103.1 |
| 6,485,285 B1 | * | 11/2002 | Shiotani | B29C 45/42 414/225.01 |
| 8,235,436 B2 | | 8/2012 | Ryf | |

(Continued)

FOREIGN PATENT DOCUMENTS

| EP | 0 377 399 | 7/1990 |
|---|---|---|
| EP | 1 155 984 | 11/2001 |

(Continued)

OTHER PUBLICATIONS

International Search Report, PCT/FR2017/050485, dated Jun. 8, 2017.

*Primary Examiner* — Gerald McClain

(57) ABSTRACT

The present invention relates to a tool that is to be mounted on a handling device and grips pallet bases, the tool including a frame and a gripper for the bases that is mounted on the frame. The gripper is movable in the frame in such a way as to cooperate with a single edge of a pallet. The present invention relates to a corresponding transfer apparatus and a corresponding method.

10 Claims, 2 Drawing Sheets

(56) References Cited

U.S. PATENT DOCUMENTS

| | | | |
|---|---|---|---|
| 8,777,551 B1 | 7/2014 | Widder et al. | |
| 9,242,818 B2 | 1/2016 | Bando et al. | |
| 2009/0162181 A1* | 6/2009 | Ryf .................... | B65G 47/90 |
| | | | 414/788.1 |
| 2014/0169925 A1 | 6/2014 | Bando et al. | |

FOREIGN PATENT DOCUMENTS

| | | |
|---|---|---|
| EP | 2 072 430 | 6/2009 |
| EP | 2 716 584 | 4/2014 |
| FR | 2558811 | 8/1985 |
| FR | 2723732 | 2/1996 |
| JP | 06 255772 | 9/1994 |
| JP | 2001-122437 | 5/2001 |
| JP | 2001122437 A * | 5/2001 |
| JP | 2009-126609 | 6/2009 |

\* cited by examiner

TOOL AND METHOD FOR GRIPPING A PALLET

This invention pertains to the field of equipment for the transfer of products from or to a pallet, and it has as its object, on the one hand, a special gripping tool as well as a robotic device comprising such a tool, and, on the other hand, a method that uses this device.

In the field of robotized palletization or depalletization, it is necessary to transfer products—of the bottle, case, or box type—individually or in groups. The products are generally organized on a pallet, with multiple layers each comprising multiple products. The products are transferred from the pallet to the processing line for a depalletization, or from the line to the pallet for a palletization.

It is also necessary to transfer pallets, to bring in empty pallets for the purpose of a palletization process thereon, or to release an empty pallet for the purpose of a process for depalletization of products that it was carrying.

A conventional robotized transfer device is then able to process, on the one hand, the transfer of products from or to the pallet, and, on the other hand, the transfer of a pallet from or to the product transfer area.

A transfer device thus is based on a tool, gripping-head type, equipped with product gripping means. Generally, each product is held individually. To succeed in transferring an empty pallet, the same tool is then occasionally also itself equipped with a pallet gripping means.

A principle that is then known by, for example, JP2001122437, FR2723732, or else FR2558811 is based on providing, in the area of this tool, hook-like arms that can be retracted by rotation into said tool. A pair of hooks faces a second pair of hooks, and the pallet that is grasped rests on the end of these hooks. The hooks thus support the empty pallet, being inserted into two sides of the pallet opposite one another.

Such a principle has drawbacks, however.

Actually, the pairs of arms should be far enough apart to receive between them a pallet, which clearly manifests itself either by a significant base of the tool on which they are mounted or by a complex retraction system for a movable tool.

Another drawback is the space requirement that such arms represent on a tool, even in the retracted position.

In addition, with this tool being moved by a robot or other handling device, its weight has a direct impact on the required sizing so that said robot reaches the desired cadences and the corresponding accelerations. In this regard, the gripping means are a weight source to be improved upon.

Thus, there is a need to improve the state of the art as described above, in particular to reduce its weight and/or space requirement, and/or the complexity.

To do this, the invention proposes grasping the empty pallet from a single one of its edges, by holding it in cantilevered position rather than supporting it from two locations between which the center of gravity of the pallet is located. This thus makes it possible to use a gripping solution with an open front.

The invention thus has as its object a tool to be mounted on a handling device and able to grasp pallet-type flat bases, with said tool comprising a frame, as well as a gripper for said bases, mounted on said frame.

This tool is characterized in that the gripper can move in the frame to work with a single edge of a pallet.

The invention also has as its object a complete transfer device for moving pallets, namely a robotic transfer device comprising, on the one hand, a multi-axis handling device, and, on the other hand, mounted on it to move it, a tool as described above.

The invention also has as its object a method that is implemented, namely a method for gripping empty pallets using a tool comprising a gripper mounted to move on a frame of said tool, method comprising steps consisting in Extending the gripper to bring it into an active position;
Picking up a pallet using said gripper;
Moving the tool so that it takes said pallet with it;
Releasing the pallet at its destination;
Retracting the gripper.

This method is characterized in that picking up the pallet essentially consists in putting it in cantilevered position, from one of its edges.

The invention will be better understood thanks to the description below, which is based on possible embodiments, explained in a way that is illustrative and not at all limiting, with reference to the accompanying figures, in which.

Figure 1:
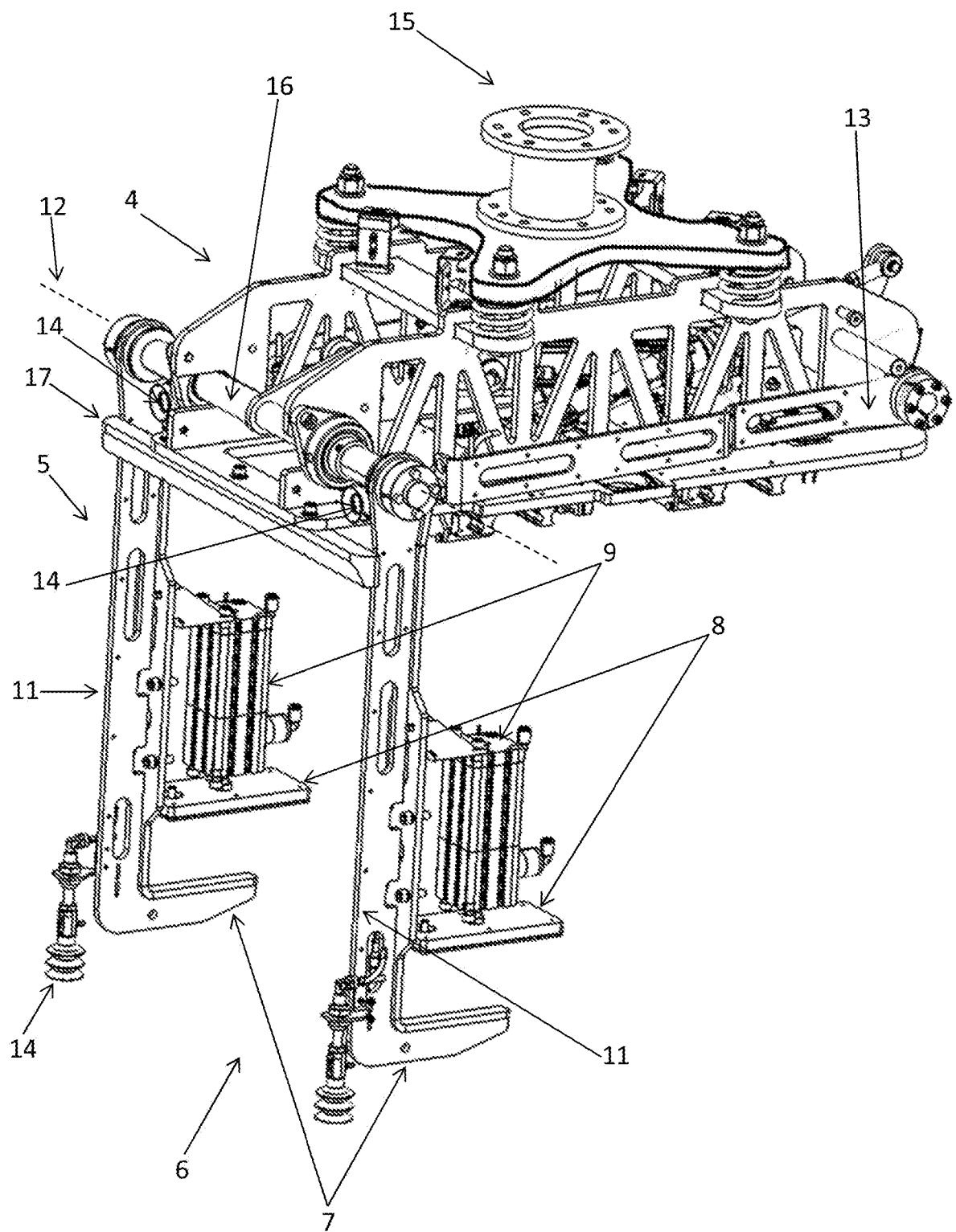
FIG. 1 shows a possible embodiment for some of the elements of the invention.

The invention therefore first of all has as an object a tool 1, to be mounted on a handling device 2 and able to grasp pallet-type flat bases 3, with said tool 1 comprising a frame 4, as well as a gripper 5 for said bases, mounted on said frame 4.

According to a particular embodiment of the invention, the tool 1 is also able to grasp products. Hereinafter, the characteristics that are described apply both to a tool 1 that can grasp products and to a tool lacking this ability.

According to this particular embodiment, the tool 1 is thus used, on the one hand, to grasp and transfer products, and, on the other hand, to grasp and transfer bases or pallets 3. The products are generally stored in the form of multiple products creating a layer and with multiple layers being placed on the base or pallet 3. In a use for palletization, the tool 1 transfers up to a palletization area an empty pallet 3 and then the products to be palletized. In a use for depalletization, the tool 1 transfers the products from the depalletization area where the full pallet 3 is found, and then transfers the empty pallet 3.

An insert, in the form of a sheet, for example cardboard, laminated or otherwise, is sometimes used to separate two successive layers of products on the pallet 3. The tool 1 can then also be responsible for the transfer of this insert, there again either to the palletization area or from the depalletization area.

The tool 1 is mounted at the movable end of a handling device 2 so that it can be moved into its work area, which covers in particular the palletization or depalletization area, as well as, in the case where it is also used to grasp and transfer products, the area for picking up or dropping off products, as well as the area for picking up or dropping off the pallet 3, possibly also the insert. The frame 4 makes it possible to mount the tool 1 on the handling device 2 and to attach functional elements.

According to the invention, the gripper 5 can move within the frame 4 to work with a single edge of a pallet 3 by being movable in particular from a side of said frame 4. The gripper 5 forms the part of the tool 1 that is used to process the pallets 3 or bases. It is retractable and therefore has two different positions, namely a work position and a retracted position. In the work position, when the tool 1 is able to grasp products in addition to pallets, it can reach a surface beyond the one where the products are held in the tool 1. It is therefore necessary to retract it so that it does not hamper the function of the tool 1 when it works to grasp the products themselves.

At the time of its being picked up by the tool 1, the base or pallet 3 is essentially horizontal. At this time, the gripper 5 extends essentially in a vertical plane in its work position. With the same position of the tool 1 in the space, the gripper 5 extends essentially horizontally once in the retracted position.

The gripper 5 therefore grasps the base or pallet 3 at a single one of its edges, with the pallet 3 therefore being held by the tool 1 in cantilevered position from the gripper 5 and optionally dissymmetrical in relation to the tool 1 itself.

The pallet 3 actually has an overall rectangular shape, generally not square, and thus has four edges. To transfer the pallet 3, the proposed tool 1 therefore grasps it by only one of its edges and not simultaneously at opposite edges. The gripper 5 is thus more compact than in an approach grasping the pallet 3 in a symmetrical way. The tool 1 is thus lighter, and the handling device 2 can be less powerful, and housing the gripper 5 in the tool 1 in the retracted position is easier and more compact in terms of design.

Preferably, the gripper 5 is movable and extends essentially from a side of the tool 1 in the work position. The gripper 5 can move in rotation at an axis of rotation 12 that is located along one side of the tool 1.

According to a possible additional characteristic, the gripper 5 comprises a clamping means 6 forming a vise for grasping the edge of a pallet 3 in such a way as to hold it in cantilevered position. The clamping means 6 forming a vise thus has two jaws that face one another and that move close to one another with the pallet 3 between them, for the purpose of grasping it firmly, and then that move away from one another to free it and to release it. Unlike the state of the art, the gripper 5 therefore only provides support for the bottom of the pallet 3. The pallet 3 is clamped between the jaws of the clamping means 6 to be anchored in the tool 1 and to be immovable in relation to the tool. The clamping means 6 therefore acts on a fairly large surface area of the pallet 3 to exert the required force.

According to another possible additional characteristic, the clamping means 6 has, on the one hand, a support 7 of the pallet 3, in particular for being inserted into the pallet 3, and, on the other hand, a cap 8, to be placed opposite the support 7, in such a way that the pallet 3 is picked up between the support 7 and the cap 8 that together form a vise, with only a part or all of its thickness.

The pallet 3 actually has openings in its sides, for the purpose of making it possible to insert fork-lift tynes. It is thus possible to insert one of the two above-described jaws of the clamping means 6 of the gripper 5 into these side openings. The other jaw is located beyond the surface for receiving products that the pallet 3 offers.

The pallet 3 delimits an upper surface, on which products can be received, and a lower surface, at which it comes into contact with a plane on which it rests. One of the jaws, preferably the support 7, can then optionally come between these surfaces. Alternatively, the two jaws can each be located beyond these surfaces, outside of the template defined between them. With the pallet 3 being made sometimes of a ply structure of wood boards, the clamping means 6 can grasp only a part of this ply structure.

In advantageous embodiments, the support 7 has a length of between 10 and 18 centimeters, preferably approximately 12.5 centimeters. Thus, the support 7, which forms the lower element of the clamping means 6, can be inserted from the section of the pallet 3 up to approximately between 10 and 18 centimeters, preferably approximately 12.5 centimeters. Preferably, the support 7 has a length in the range from 2 to 50%, in particular 3 to 30%, preferably 5 to 20%, of the size of the pallet 3 that is along the support 7 when it is inserted into the pallet.

As will be even further described, the support 7 can be formed by several surfaces that are spaced apart from one another, each intended to come to a predefined position in the section of the pallet 3. FIG. 1 actually shows a support 7 in the form of two different surfaces, carried by the free and curved ends of the gripper 5 and spaced apart from one another. The cap 8 is itself also formed by two different surfaces, arriving at the front of the two support surfaces 7. Any configuration is possible for producing a clamping means 6 with a work surface that is adequate for clamping the pallet 3 and holding it.

According to a possible additional characteristic, the cap 8 can move in the gripper 5 to come close to the support 7 and thus to clamp the pallet 3 or to move away from it and thus to release the pallet 2, with the gripper 5 being further equipped, on the one hand, with an actuator 9 that acts on the cap 8, and, on the other hand, with a separate linear guide 10 for moving said cap 8 in the gripper 5.

The actuator 9 acts like the element that ensures the clamping force of the clamping means 6. It is surrounded by a guide 10, so as to prevent the torsion force generated by the pallet 3 held in cantilevered position from being compensated integrally by the actuator 9 itself. The gripper 5 of the pallet 3 is therefore equipped, on the one hand, with a clamping means 6 that acts under the influence of an actuator 9 for firmly clamping the pallet 3, and, on the other hand, with a means dedicated to the absorption of the torque generated by the holding of the pallet 3 in cantilevered position.

As the attached figures show, the gripper 5 has two arms 11 that are separated from one another and whose ends each form a support surface 7 and that each carry a cap 8 that is mounted, on the one hand, on an actuator 9 for the application of the required clamping force, and, on the other hand, on a guide 10 to ensure its position. The cap 8 and the support 7 bear a flat surface that comes up against the pallet 3. The actuator 9 and the guide 10 are attached to the arms 11 of the gripper 5.

The guide 10 and the actuator 9 are preferably, in relation to the jaws of the vise formed by the cap 8 and the support 7, next to the frame 4. Thus, the guide 10 and the actuator 9 are between the frame 4 and the pallet 3 that is grasped.

According to another possible additional characteristic, the gripper 5 has a number of arms 11 integral in rotation in the tool 1 around an axis of rotation 12 located at one edge of the tool 1, with said arms 11 each having, at their free ends, a claw for together forming the clamping means 6. The arms 11 are preferably integral because they are mounted on the ends of the same shaft 16.

Said claw thus has a first jaw and a second jaw, designed to come above the first in the position of picking up the pallet 3 with the support 7 being formed in particular by the number of first jaws, the cap 8 being formed by the number of second jaws.

According to a possible additional characteristic of the tool 1, it has, on the one hand, at least one retractable lever 13 that is mounted to move on the frame 4 at the side opposite to the one where the gripper 5 is mounted, and, on the other hand, a number of suction cups 14, for grasping an insert, at least one of them being mounted on the gripper 5 and at least one other being mounted on said at least one lever 13.

Preferably, the tool 1 has two such levers 13, each on one side of the tool 1. The tool 1 thus has two U-shaped structures, one dedicated to suction cups 14 located on its end, the other carrying the gripper 5 and its clamping means 6 as well as other suction cups 14. The two U-shaped structures face one another and can move independently of one another, rotating around parallel axes, each located on one edge of the tool 1. Each of the two structures has two positions, one retracted where it does not hamper the picking up of products by the tool 1 when the latter is also dedicated to picking up and transferring products, and one of work, in which it extends in cantilevered position from the frame 4.

The U-shaped structure bearing only the suction cups 14 is in the work position only upon the occasion of the grasping of an insert, whereas the U-shaped structure that forms a gripper is in the work position, on the one hand, for grasping a pallet 3, and, on the other hand, for grasping an insert. The structure bearing only the suction cups 14 is therefore normally in the work position only when the other U-shaped structure is as well.

Each U-shaped structure is put into motion using an eccentric gear provided on the central shank of the U and at the end of which a jack-type actuator acts. The retracted or extended position of this jack therefore defines the state of the corresponding structure, either in the retracted position, parallel to the bottom of the tool 1, or in the work position, extending parallel to the bottom of the tool 1.

In preferred embodiments, the tool 1 also has, mounted on the frame 4, surfaces of stops 17 against which the gripper 5 is flattened in the active position, and positioned in such a way as to contribute to absorbing the force created by the weight of the pallet 3. Under the influence of the weight of the pallet 3, the gripper 5 is flattened against these stop surfaces, which stabilizes it in position.

The invention also has as its object a device, in which this tool 1 is mounted, to transfer pallets 3, possibly also inserts, in the form of flat, generally cardboard or else laminated, elements. Thus, this is a robotic transfer device comprising, on the one hand, a multi-axis handling device 2, and, on the other hand, mounted on it to move it, a tool 1 as described above.

The robotic device can comprise in particular, in addition, a means for grasping at least one product—such as a bottle, box, etc.—which must then be dropped off or picked up by the tool 1 on or above a pallet 3, with the products preferably being organized on the pallet 3 into superposed layers of multiple products next to one another. Such a means for picking up products can be at the tool 1, in the form of a set of tulip-type suction cups, which each grasp a product, or else two sides that face each other and between which at least one product can be picked up.

The invention also has as its object a method of implementation for a device or a tool 1 as described above, namely a method for gripping empty pallets 3 using a tool 1 comprising a gripper 5 that is mounted to move on a frame 4 of said tool 1, method comprising steps consisting in Extending the gripper 5 to bring it into an active position;
Picking up a pallet 3 using said gripper 5;
Moving the tool 1 so that it takes with it said pallet 3;
Releasing the pallet 3 at its destination;
Retracting the gripper 5.

As has already been said, the gripper 5 is to be retracted into the tool 1 in particular so as not to hamper the picking up of products by it when it is adapted to do this. It therefore switches into the work position upon transfer from a pallet 3 or an insert.

According to the invention, picking up the pallet 3 essentially consists in picking it up in cantilevered position from one of its edges. Force is therefore exerted on the pallet 3 also from its upper part, and not only from its lower part. The pallet 3 is then firmly held in the tool 1, which therefore brings it along in its movement, with the latter being caused by the handling device 2 at the end of which it is mounted. The pallet 3 is therefore held clamped in position in the tool 1 at only one of its edges.

According to a possible additional characteristic, the picking up of the pallet 3 is done by clamping it at the pick-up edge, i.e., at its edge at which the pallet 3 is held by the tool 1. This picking up by clamping is done in particular between two jaws grasping a part of the thickness of the pallet 3, or else between two jaws that grasp at least one constituent board of the pallet 3.

In certain embodiments, the pallet 3 is picked up in a way that is asymmetrical in relation to the tool 1, in such a way that, viewed perpendicularly to the grasped pallet 3, its center of symmetry is offset from that of the tool 1. The center of gravity of the pallet 3 is not perpendicular to the plate 15, with the latter normally being positioned centered in the tool 1. In other words, the gripper 5 is such that its active position does not depend on the size of the pallet 3 to be processed, which considerably simplifies, of course, the tool 1 and therefore reduces its weight. The pallet 3 extends essentially from an edge of the frame 4, from which extends the gripper 5 in the active position.

Finally, according to another possible additional characteristic, the picking up of the pallet 3 is done by raising the pallet 3 using a first jaw that is inserted in advance, to offset the pallet 3 from its base at the pick-up edge, and then clamping a second jaw against it, with the pallet 3 being picked up between the two of them. The pallet 3 is therefore offset from its support surface at its edge where it is picked up by the gripper 5, and this before being effectively clamped by the force that the counter-jaw exerts for a firm hold in the tool 1. The clamping of the edge of the pallet 3 can have the effect of raising its opposite edge and then detaching it entirely from the surface on which it rests. Raising the other edge can also be done after the clamping of the pallet 3, by then moving the tool 1.

In the embodiment illustrated in the accompanying figures, the tool 1 has a structural frame 4 that makes it possible to attach the various elements of the tool 1 and to anchor it to the handling device 2, optionally with at least one degree of freedom.

The tool 1 is designed to be mounted at the end of a handling device 2 that is preferably a multi-axis robot. The tool 1 therefore has, in an upper part, a plate 15 for attaching the tool 1 to the handling device 2. It will be understood that putting the handling device 2 into motion makes it possible to move the tool 1 into the work area, which can comprise a stack of products, above a pallet 3, with these products either to be dropped off onto the pallet 3 or to be picked up there by the tool 1. Projected onto the ground, the work area therefore also comprises the area where the pallet 3 rests.

The tool 1 is used in particular in moving empty pallets 3 one by one. A pallet 3 generally takes the shape of a flat base of rectangular geometry, with a receiving surface, upward, and a support surface, downward, on the ground. The section of a pallet 3 generally has openings for the insertion of elements whose purpose is to raise said pallet 3, even when it is placed on a surface that is at least as large as it is.

Under the frame 4, the tool 1 can have a product gripping means. This gripping means can hold the products firmly, such as grasping them one at a time by tulips, or with the possibility of moving them, such as grasping them in batches or by pushing them from one side. A product gripping means can thus be formed by two sides between which the products are picked up and clamped. These can also be suction cups, etc., capable of grasping each product one at a time. The product gripping means can pick up multiple other shapes, like a magnetic plate for grasping metal objects of the box or can type, etc.

A product can thus be a container, bottle or flask, made of glass, plastic, metal, etc., or else a group of such individual parts, in particular in a box, a carton, a bundle, or other packaging. The tool 1 is able to process a single product at one time or else multiple products at the same time, and even simultaneously a layer of products. The products are actually normally layered on a pallet 3, which itself remains stationary, often on the ground or on a low conveyor that circulates the pallets 3.

As will also be described later, a third function of the tool 1 can be to transfer cardboard sheets or inserts that are normally between the successive layers of products.

The transfer of a pallet 3 makes it necessary at least to raise it. To do this, the tool 1, unlike in the prior art where the pallet 3 is simply carried from the bottom, grasps the pallet 3 by a single side, and holds it in cantilevered position.

Thus, the tool 1 is equipped with a gripper 5 that clamps a pallet 3 at one of its edges. The pallet 3 is actually generally rectangular in shape and has four edges. Thanks to the gripper 5, the tool 1 clamps one of these edges well enough to be able then to entrain the pallet 3 in its movement. Of course, the force of this clamping does not reach values that can lead to degradations of the pallet 3.

As FIG. 1 shows, the gripper 5 is therefore mounted at one side of the tool 1. In other words, the means used to entrain the pallet 3 is only on one side of the tool 1 and not, in addition, on the other side. In the prior art, the tool 1 works with two opposite edges of the pallet 3, and the means used for entraining the pallet 3 is therefore on two opposite sides of the tool 1.

In particular so as not to hamper the grasping of products when the tool 1 has a product gripping means, the gripper 5 is retractable and therefore has at least two positions: an active position in which it can reach the section of a pallet 3 with the rest of the tool 1 placed above said pallet 3, and a retracted position in which the gripper 5 is entirely on the same side of the pallet 3.

The gripper 5 therefore comprises a form of vise, between two jaws that are brought close to clamp between them all or part of the section of the pallet 3. The effective surface of this vise is adequate to exert the required force on the pallet 3 without the weight of the latter thereby affecting it adversely when it is only held by the gripper 5 at this vise. It may therefore be a vise with a single pair of separate elements each forming one of the jaws. It may also be a vise with multiple such pairs, separated from one another to distribute the weight of the pallet 3 along the pick-up side: two pairs, or more.

More specifically, in the embodiment that is illustrated in particular in FIG. 1, the gripper 5 takes the form of a pivoting structure, around an axis of rotation 12 that is in the top part of the tool 1, on one side.

The gripper 5 thus comprises two arms 11, each mounted at one of the ends of an aligned shaft 16 and rotating in the axis of rotation 12. The ends of the shaft 16 are preferably at the side ends of the tool 1. Thus, when the shaft 16 is rotated, the pivoting structure rotates and the arms 11 travel in planes on the edges of the tool 1. The arms 11 are to travel each at one side of the tool 1, in particular against the product gripping means.

The vise of the gripper 5, being used to clamp the pallet 3, is at the ends of the arms 11, where it comprises, each time, a pair of elements between which a part of the edge of the pallet 3 is clamped.

As FIG. 1 shows, each arm 11 has on its end a pair of elements that comprises, on the one hand, a support 7, and, on the other hand, a cap 8 for forming a clamping claw of the pallet 3. The support 7 is formed by the extension of the shank of the arm 11, curved into a handle or L. The cap 8 is opposite the support 7, at a variable distance.

The cap 8 is mounted on the shank of the arm 11 by means of a jack-type linear actuator 9. In FIG. 1, it is the chamber of the actuator 9 that is mounted on the shank of the arm 11, and the cap 8 is mounted on the rod of the actuator 9, movable in said chamber. The actuator 9 is therefore put into motion to clamp or unclamp a part of the edge of a pallet 3 between the support 7 and the cap 8.

Figure 2:
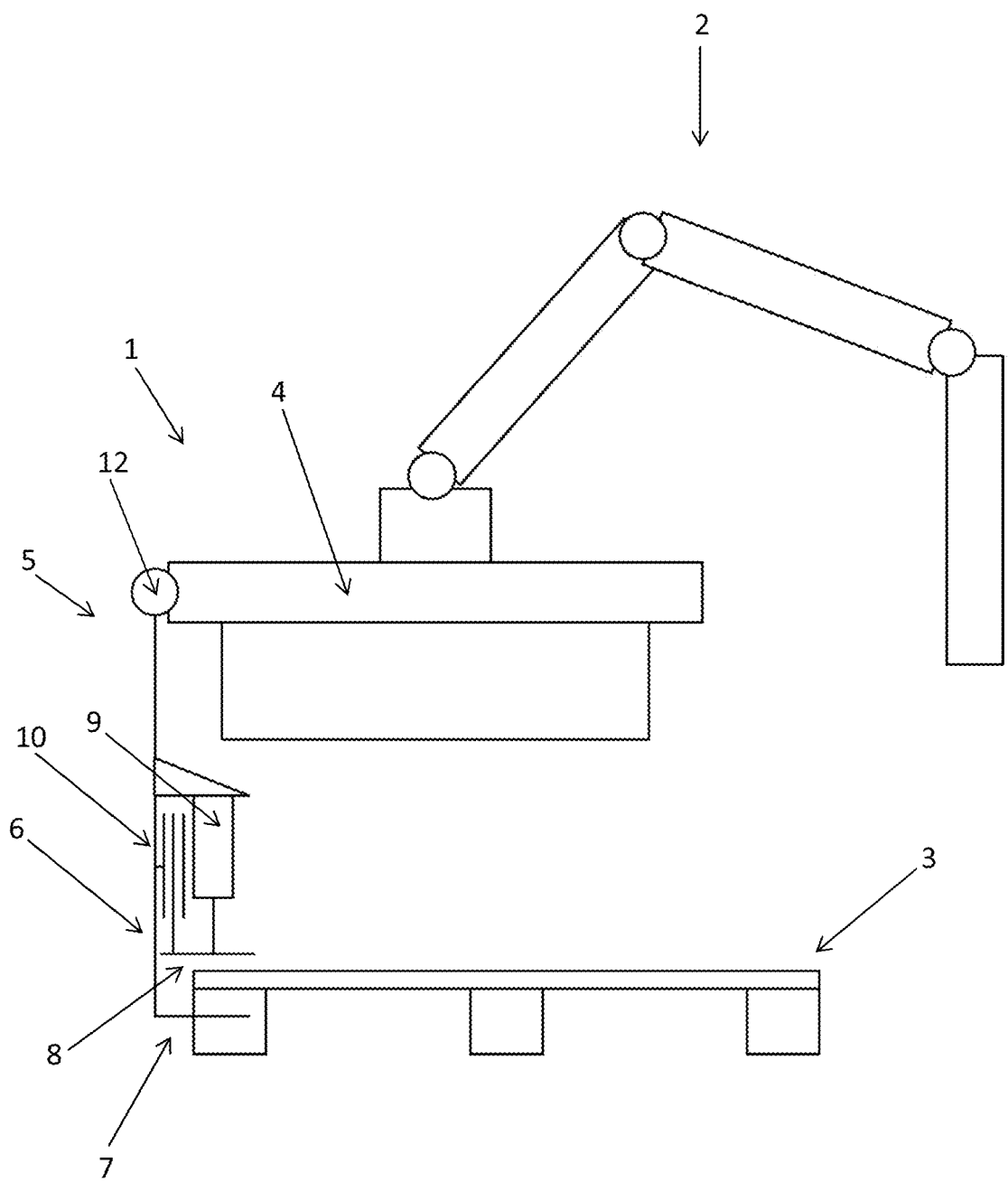
FIG. 2 is a schematic diagram, with a pallet.

The gripper 5 preferably also comprises a guide 10 that is complementary to the actuator 9, see FIG. 2, which makes it possible to prevent the dissymmetry of the forces exerted by the pallet 3 on the formed pair of the support 7 and the cap 8 from turning into excessive rotational torque on the actuator 9. This guide 10 is to be mounted, for example, between the actuator 9 and the shank of the arm 11.

Thanks to the gripper 5, the tool 1 grasps the pallet 3 in cantilevered position, i.e., it extends beyond, starting from, the area for picking up by said tool 1, in particular its center of gravity, and even the entire pallet 3, being beyond the area for picking up by the gripper 5, which is limited here to one edge. The center of gravity of the pallet 3 is therefore not inside the polygon formed by a number of pick-up areas that are spaced apart from one another.

To grasp the pallet 3, the gripper 5 is inserted in part into the pallet 3 itself. The end of the gripper 5 is therefore inserted between, on the one hand, the upper level of the pallet 3, on which the first layer of products is dropped off, and, on the other hand, the support surface or bottom of the pallet 3 that comes into contact with the ground when the pallet 3 is placed there. Actually, the pallet 3 normally has apertures or openings in its sides. It is then sufficient to insert into the shank of the pallet 3 one of the jaws of the claw thanks to which the gripper 5 grasps it, with the other jaw then being either against the upper surface of the pallet 3 or against its lower surface.

The free end of the shank of the arm 11, bent as FIG. 1 shows, is then inserted into the pallet 3 from its side. The bent part represents approximately between 10 and 20 centimeters, or a sufficient distance to achieve the hold required for the pallet 3 but small enough to have a reduced space requirement in the tool 1 once in the retracted position.

As FIG. 1 shows in particular, the plate 15 has an axis of symmetry, perpendicularly to which the tool 1 has overall a rectangular shape, on whose edges the arms 11 of the gripper 5 change, by rotation at another edge, perpendicular. The center of gravity of the tool 1 is normally close to and even on this axis of symmetry.

In their active position, the arms 11 are essentially parallel to the axis of symmetry of the plate 15. In their inactive or retracted position, the arms 11 are essentially parallel to one another, in a plane that is perpendicular to said axis of symmetry, in the top part of the tool 1.

Thus, when the pallet 3 is picked up by the tool 1, its pick-up edge is essentially in the extension of one edge of the tool 1, or of its frame 4. In addition to the fact that it is held by a single side of its center of gravity and therefore in cantilevered position, the pallet 3 is also optionally asymmetrical in relation to the plate 15. Thus, once grasped by one side, the center of gravity of the pallet 3 cannot be in the extension of the plate 15. In addition, during the transfer, the center of gravity of the pallet 3 can be neither on the vertical nor on the plate 15 and then exert torque at the mounting of the tool 1 on the handling device 2, nor on the axis of rotation and then exert torque at the axis of rotation 12. The path of transfer of the pallet 3 can be adjusted to reduce as much as possible, and even to eliminate, this or these torque(s) by placing the pallet 3 with the necessary orientation.

As FIG. 1 shows, the tool 1 also comprises a stop 17. This stop 17 takes the form of a small cross-beam, essentially parallel to the axis of rotation 12 and close to it. The pivoting structure, in the shape of a U whose two branches are formed by the arms 11 and the shank by the shaft 16, can rest against this small beam or stop 17, at the end of movement toward the active position. This makes it possible to limit the force to be created to compensate for the weight of the pallet 3 in cantilevered position in relation to the axis of rotation 12.

The gripper 5 is put into motion thanks to a dedicated jack, acting on an eccentric foot mounted on the shaft 16, which itself is mounted in the frame 4 of the tool 1 with the ability to rotate along the axis of rotation 12.

As has been specified above, an additional function of the tool 1 is to be able to grasp cardboard sheets, generally used to separate one from the other of the layers of superposed products from a pallet 3. To do this, the tool 1 is equipped with a set of pneumatic suction cups 14. These pneumatic suction cups 14 are retractable, in particular so as not to hamper the product gripping means of the tool 1 when it is equipped with such a means, when they are not in operation.

Preferably, the tool 1 comprises four remote suction cups 14 forming a rectangle in active configuration. These suction cups 14 take advantage of the space that is available on the gripper 5 and are mounted on it, at least for a portion of them.

Thus, at the end of each arm 11 of the gripper 5, the tool 1 has a pneumatic suction cup 14. In addition, the tool 1 has a pair of levers 13 that can be retracted by pivoting around a direction parallel to the axis of rotation 12 of the gripper 5 and located at the opposite edge of the tool 1. A suction cup 14 is located at the free end of each of these levers 13. Thus, with the rotating levers 13 being separated from one another in a way that is similar to the arms 11, the tool 1 is equipped with a group of four suction cups 14 forming the corners of a rectangle, two at the ends of the gripper 5, and two at the ends of the levers 13, on the opposite edge.

Viewed perpendicularly to the axis of symmetry of the attachment plate 15, the axis of rotation 12 of the gripper 5 and the direction around which the levers 13 rotate are at opposite sides of the rectangular shape that the tool 1 offers.

As has been mentioned above, this tool 1 with gripper 5 of pallet 3 is normally mounted on a handling device 2 to form a robotic device, ensuring the transfer of pallets 3, and even also the transfer of flat inserts and/or the transfer in particular of products from or to the top of a pallet 3.

For grasping a pallet 3, the method is preferably as follows. The handling device 2, preferably in the form of an articulated robot, brings the tool 1 close to the pallet 3, whereas the gripper 5 is in the active position and therefore the claws that are at the ends of the arms 11 are in the lower area. The tool 1 is then moved so that one of the jaws, preferably the one from below, therefore the at least one support 7, is inserted into the shank of the pallet 3.

Once this jaw is under a part of or in the pallet 3, the tool 1 is lifted to entrain the pallet 3 and to raise it at this edge. At this stage, the pallet 3 remains resting on the opposite edge and therefore undergoes a slight rotational movement around said opposite edge. Once the pallet 3 is offset from the support on which it is located, at the pick-up edge, the claw is clamped, i.e., the cap 8 and the support 7 are brought close to one another with an end of pallet 3 between them, preferably one of its constituent boards, to clamp it and to bind it firmly with the tool 1. Clamping the pallet 3 only once it has been offset from its support perpendicular to clamping makes it possible to prevent the clamping force from being transmitted to said support, which can be, for example, a stack of pallets 3, one of which could be broken in the event of excessive pressure. Actually, the gripper 5, between its jaws, serves a preferably closed section, such as a solid board: the clamping force is applied to the material of the pallet 3 and then prevents a possible deformation or break around an opening that is present between its jaws. The pallet 3 is then transported to its destination by being horizontal or inclined.

In a general manner, the upper surface of a pallet comprises a series of boards that are parallel and spaced in relation to one another. When the clamping means 6 grasps a pallet, it is inserted preferably crosswise to the parallel boards. According to a particular embodiment, the length of the clamping means, i.e., the size crosswise to the boards of the pallet when the clamping means grasps a pallet, is considerably smaller than the size of the pallet crosswise to the boards. In other words, the clamping means grasps only one board of the pallet, the one that is at the edge of the pallet, beside where the clamping means is inserted.

Thus, when the clamping means 6 has a support 7 and a cap 8, the support 7, and even also the cap 8, is (are) inserted into the pallet in such a way as to grasp only the first board of the pallet located at the edge that is grasped by the clamping means 6.

Thanks to the invention, it is thus possible to have a multi-functional tool 1, namely able to transfer pallets, or bases, and even also inserts and/or products, and since this tool 1 is always light and compact, it therefore does not require a handling device with excessive power and can have good dynamism.

Although the description above is based on particular embodiments, it is in no way limiting of the scope of the invention, and modifications can be provided, in particular by substituting technical equivalents or by a different combination of all or part of the characteristics developed above.

The invention claimed is:

1. Method for gripping empty pallets (3) using a tool (1) comprising a gripper (5) having a clamping means (6) mounted to move on a frame (4) of said tool (1), method comprising:
    extending the gripper (5) to bring it into an active position;
    picking up a pallet (3) using said clamping means (6) forming a vise for grasping a single edge of the pallet (3) on a first surface and a second surface opposite the first surface, wherein the pallet (3) is picked up at a distance less than a midpoint of a length of the pallet, causing the pallet to be placed in a cantilevered position having the gravity center of the pallet base (3) being located beyond said clamping means (6);
    moving the tool (1) so that it takes said pallet (3) with it;
    releasing the pallet (3) at a destination; and
    retracting the gripper (5).

2. Method according to claim 1, wherein picking up the pallet (3) is done by clamping it at the pick-up edge.

3. Method according to claim 1, wherein
the pallet (3) is picked up in a way that is asymmetrical in relation to the tool (1).

4. Method according to claim 1, wherein
picking up the pallet (3) is done by raising the pallet (3) using a first jaw inserted in advance to offset the pallet (3) from its base at the pick-up edge, then clamping a second jaw against it, with the pallet (3) being picked up between the two of them.

5. Method according to claim 1, wherein the clamping means (6) comprises a support (7) of pallet (3), as well as a cap (8) to come opposite the support (7).

6. Method according to claim 5, wherein the support (7) has a length of between 10 and 18 centimeters.

7. Method according to claim 5, wherein
the cap (8) moves in the gripper (5) to the support (7) and thus to clamp the pallet (3) or to move away from it and thus release the pallet (2), with the gripper (5) being equipped, in addition, with an actuator (9) that acts on the cap (8), and with a separate linear guide (10) for the movement of said cap (8) in the gripper (5).

8. Method of claim 5, wherein the support (7) is structured and arranged for insertion into the pallet (3).

9. Method according to claim 1, wherein the gripper (5) has a number of arms (11) located at one edge of the tool (1), with said arms (11) each having, at their free ends, a claw for together forming the clamping means (6).

10. Method according to claim 1, further comprising at least one retractable lever (13) that is mounted to move on the frame (4) at the side opposite to the one where the gripper (5) is mounted, and, a number of suction cups (14), for grasping an insert, at least one of them being configured to mount to the gripper (5) and at least one other being configured to mount to said at least one lever (13).

* * * * *